No. 645,042. Patented Mar. 6, 1900.
C. H. MOWER.
APPARATUS FOR HEATING MILK FOR STOCK.
(Application filed Aug. 28, 1899.)
(No Model.)
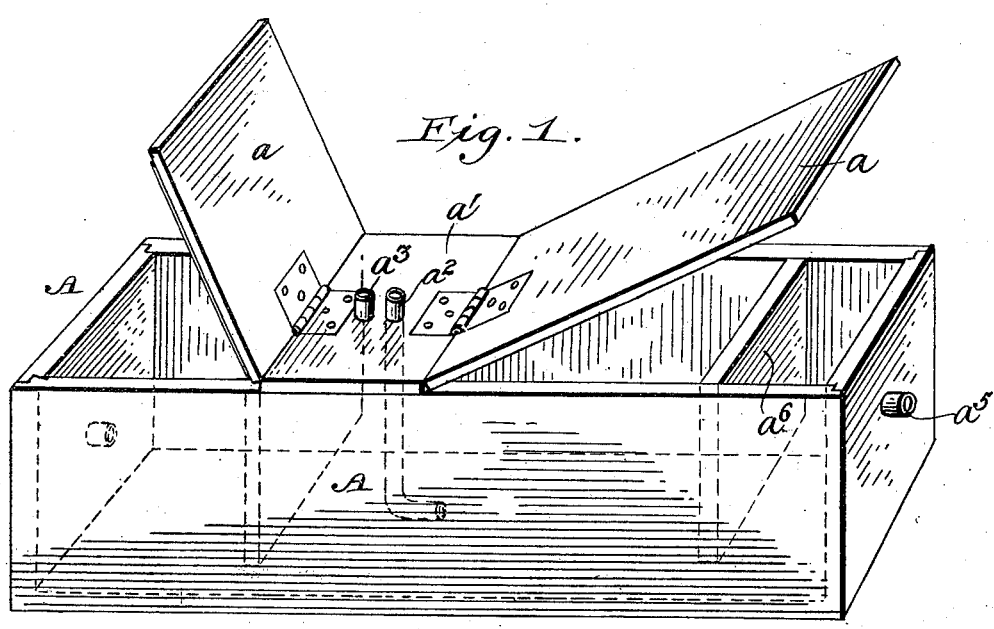
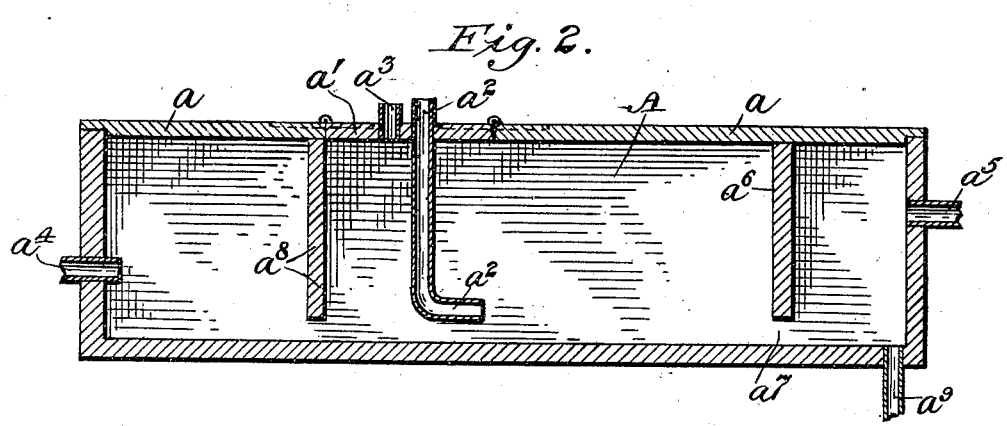
WITNESSES
Severance.
Allan H. Fuss.
INVENTOR
Charles H. Mower
by his Attys
Mason Fenwick & Lawrence

UNITED STATES PATENT OFFICE.

CHARLES H. MOWER, OF QUIGLEY, IOWA.

APPARATUS FOR HEATING MILK FOR STOCK.

SPECIFICATION forming part of Letters Patent No. 645,042, dated March 6, 1900.

Application filed August 28, 1899. Serial No. 728,770. (No model.)

*To all whom it may concern:*

Be it known that I, CHARLES H. MOWER, a citizen of the United States, residing at Quigley, in the county of Clinton and State of Iowa, have invented certain new and useful Improvements in Apparatus for Heating Milk Preparatory to its Being Fed to Stock; and I do hereby declare the following to be a full, clear, and exact description of the invention, such as will enable others skilled in the art to which it appertains to make and use the same.

My invention relates to improvements in an apparatus for heating milk preparatory to being fed to stock; and it consists of a box or trough having an inlet for milk and an outlet for milk, a baffle-plate or station for causing the good or heavy milk beneath the same to pass out at the exit, whereby the foam is collected in the top of the box or trough, another baffle-plate for preventing steam from discharging directly against the incoming milk, an inlet for milk and an exhaust for steam, and suitable doors or covers for allowing access to the interior of the box or trough to facilitate cleaning out the same.

The object of my invention is the production of an apparatus for heating milk preparatory to being fed to stock and preferably by the use of exhaust-steam, the construction and arrangement being such that the foam, which is usually so troublesome in devices of this kind, can be conveniently handled and the milk drawn off, the same being admitted to the box without interfering with the incoming milk.

In the accompanying drawings, Figure 1 is a perspective view of my improved apparatus for heating milk preparatory to being fed to stock, and Fig. 2 is a vertical longitudinal section through the same.

A in the drawings represents a box or trough which is provided with covers $a$, which are hinged or otherwise secured thereto. The two covers are preferably provided, so that the interior of the boxes can be readily cleaned. A stationary cover portion $a'$ is provided between the hinges and through which said hinges are attached and through which the inlet-pipe $a^2$ for steam and the exhaust-pipe $a^3$ for steam are passed. The inlet-pipe $a^2$ for steam extends almost to the bottom of the box or trough and has its end turned toward the discharge end of the box, so as not to interfere with the incoming milk, which enters at $a^4$ and discharges at $a^5$, which latter point is slightly more elevated than the inlet-opening $a^4$. A baffle-plate or station $a^6$ is vertically arranged within the box or trough near its discharge end and extending almost to the bottom thereof, but leaving a space $a^7$ at its lower end, extending, preferably, entirely across the box, beneath which the heavy milk passes and passes out at the discharge-point $a^5$. By employing a baffle-plate or station of this construction the foam from the milk will collect in the upper portion of the box, while the heavy milk will be allowed to pass out at the opening $a^5$. $a^8$ represents another baffle-plate or station which is similarly constructed to the plate $a^6$, so as to leave a space between it and the bottom of the box or receptacle, which prevents the steam which is discharged at the lower end of the pipe $a^2$ from coming directly in contact with incoming milk and preventing its ready inflow.

$a^9$ represents a passage or draw-off pipe for drawing off milk at the end of the operation. By putting a valve in the exhaust-pipe above the box the temperature of the milk can be varied at least thirty degrees. The valve should be such as to leave an opening, so that steam drives both ways and makes no back pressure in the engine.

The invention is simple in its construction and operation and yet carries out perfectly the object for which it is designed.

Having now described my invention, what I claim as new, and desire to secure by Letters Patent, is—

An apparatus for heating milk preparatory to its being fed to stock comprising in its construction a suitable box or trough provided with an inlet for milk and an outlet for milk, the latter being higher than the former, a vertically-arranged baffle-plate or station located within the box near its discharge end with a space between the lower end of the said plate and the bottom of the box for the passage of the heavy milk thereunder, another vertically-arranged baffle-plate or station similarly constructed with a space between its lower end and the bottom of the box, a pipe for admitting steam into the interior of the box which pipe is located between the baffle-plates and extends almost to the bottom of the box and is turned toward the discharge end thereof, an exhaust for steam, and a draw-off pipe located in the bottom of the box, substantially as described.

In testimony whereof I hereunto affix my signature in presence of witnesses.

CHARLES H. MOWER.

Witnesses:
 F. L. FARNSWORTH,
 C. M. THOMAS,
 SALINA CONERY.